United States Patent
Decker

(10) Patent No.: US 6,234,427 B1
(45) Date of Patent: May 22, 2001

(54) SOLAR ARRAY REGULATION AND SPACECRAFT POINTING USING FLYWHEEL ENERGY STORAGE WITH PROGRAMMABLE VOLTAGE CONTROL

(75) Inventor: Darwin K. Decker, Hacienda Heights, CA (US)

(73) Assignee: TRW Inc., Recondo Beach, CA (US)

(*) Notice: Subject to any disclaimer, the term of this patent is extended or adjusted under 35 U.S.C. 154(b) by 0 days.

(21) Appl. No.: 08/988,055

(22) Filed: Dec. 10, 1997

(51) Int. Cl.[7] ............................................. B64G 1/44
(52) U.S. Cl. ................. 244/173; 244/165; 244/158 R
(58) Field of Search ............................. 244/165, 158 R, 244/164, 173

(56) References Cited

U.S. PATENT DOCUMENTS

| | | |
|---|---|---|
| 4,164,018 | 8/1979 | Legrand . |
| 4,188,666 | * 2/1980 | Legrand et al. . |
| 4,272,045 | * 6/1981 | Phillips . |
| 4,723,735 | 2/1988 | Eisenhaure et al. . |
| 5,261,631 | * 11/1993 | Bender et al. . |
| 5,289,998 | * 3/1994 | Bingley et al. . |
| 5,309,082 | * 5/1994 | Payne . |
| 5,315,158 | 5/1994 | Danielson . |
| 5,500,621 | * 3/1996 | Katz et al. . |
| 5,611,505 | * 3/1997 | Smay . |

FOREIGN PATENT DOCUMENTS

| | | |
|---|---|---|
| 0712781 | 5/1996 | (EP) . |
| 712781 | * 5/1996 | (EP) . |

OTHER PUBLICATIONS

Pieronek, Thomas, J., Decker, D. Kent, Spector, Victor A.: "Spacecraft Flywheel Systems—Benefits and Issues," Proceedings of the 1997 IEEE National Aerospace and Electronics Conference, vol. 2, Jul. 14–17, 1997, pp. 589–593, XP002096033, Dayton, OH, USA.

Ayer, Francois, Coco, Richard, Kelleher, William: "New Opportunities for Satellite Integrated Power and Attitude Control Systems," Proceedings of the Annual Meeting—Institute of Navigation, Jun. 19–21, 1997, pp. 831–841, XP002096034, Cambridge, MA, USA.

Havenhill, Douglas D., Robinson, Wilf, Hanks, James, Gisler, Gary, Spina, Len, Ginter, Steve: "Spacecraft Energy Storage Systems," Proceedings of the 1997 IEEE National Aerospace and Electronics Conference, vol. 2, Jul. 14–17, 1997, pp. 609–616, XP002096035.

* cited by examiner

*Primary Examiner*—Peter M. Poon
*Assistant Examiner*—Tien Dinh
(74) *Attorney, Agent, or Firm*—Michael S. Yatsko

(57) ABSTRACT

A satellite power regulation and pointing system is disclosed that comprises a power bus (104) and first and second flywheels (114–116) capable of storing rotational energy. Each flywheel (114–118) comprises a flywheel motor/generator (202) for increasing the rotational energy in its associated flywheel when storing power in its associated flywheel and for reducing the associated flywheel rotational energy when drawing power from its associated flywheel. The system also includes individual flywheel regulators (108–112) connected to the power bus (104) and to the flywheel motor/generators (202). Each flywheel regulator (108–112) includes a power control circuit (204) that allows power to flow to a flywheel motor/generator (202) from the power bus (104) during an energy storage period and that allows power to flow to the power bus (104) from the flywheel motor/generator (202) during an energy drawing period. The flywheel regulators (108–112) also include feedback control loops (206) connected to the power control circuits (204) and to the power bus (104). The feedback control loops (206) determine the energy storage period and the energy drawing period based upon a predetermined voltage reference (Vref) and a power bus voltage reference (207).

15 Claims, 3 Drawing Sheets

SOLAR ARRAY REGULATION AND SPACECRAFT POINTING USING FLYWHEEL ENERGY STORAGE WITH PROGRAMMABLE VOLTAGE CONTROL

BACKGROUND OF THE INVENTION

Satellites typically carry solar arrays that provide the power that the satellite requires to run its onboard systems. During eclipse periods however, the satellite draws energy from its batteries in order to provide power for the onboard systems. After the eclipse periods, when the solar array is once again exposed to light, the batteries are recharged using energy provided by the solar array. Thus, in the past, satellites have had to carry both solar arrays and batteries in order to provide energy to onboard systems.

The solar array and batteries also provide power to a mechanism which provides steering and pointing for the satellite. In the past, reaction wheels critically aligned with respect to three perpendicular axes have provided the steering and pointing functions. Rotating reaction wheels provide torques which depend in part on the speed and direction of rotation of the reaction wheel Known control laws are employed to adjust the reaction wheel speeds under the direction of, for example, a microprocessor, which is supplied power by the solar array and the batteries.

Batteries also require precise control over their charging profile in order to extend the battery life and thereby meet the satellite mission requirements. However, power generated by a solar array varies greatly from the beginning of life (BOL) of the solar array to the end of life (EOL) of the solar array. Because the batteries are charged with a fixed charge profile, power control circuitry must be included on each satellite to ensure that the power generated by the solar array is compatible with the charging voltage. For example, shunt regulators or series regulators are typically required to regulate power flow from the solar array and to provide the proper charging profile. In regulating the power flow from the solar array, shunt regulators simply dissipate excess current, typically through a resistor to ground. Therefore, although regulation is achieved, otherwise useful power is wasted. Series regulators, on the other hand, reduce available power to spacecraft loads due to internal losses in their circuitry.

Furthermore, reaction wheels, batteries, and the battery charge control circuitry take up a significant portion of the allocated satellite weight. Satellite batteries, in particular, are extremely heavy. As a result, a satellite cannot carry as much scientific, communications, or other equipment as it otherwise could. Furthermore, increased satellite weight also increases launch costs.

Therefore, a need remains for improved solar array regulation and satellite pointing which overcomes the disadvantages discussed above and previously experienced.

BRIEF SUMMARY OF THE INVENTION

It is an object of the present invention to provide solar array regulation and satellite pointing.

It is another object of the present invention to provide solar array regulation and satellite pointing that efficiently uses energy provided by a solar array.

Yet another object of the present invention is to provide energy storage, steering, and pointing for a satellite using flywheels.

Another object of the present invention is to substantially eliminate the batteries in a satellite.

Yet another object of the present invention is to reduce the size, weight, and cost of a satellite along with its associated launch costs.

Another object of the present invention is to reduce the size, weight, and cost of the energy storage and pointing systems of a satellite.

Another object of the present invention is to increase the amount of scientific, communications, and other equipment a satellite may carry.

The satellite power regulation and pointing system of the present invention includes a solar array connected to a power bus, at least first and second flywheels, and individual flywheel regulators connected to the first and second flywheels. The power bus carries the array voltage produced by the solar array. The first and second flywheels may be may be rotated at various speeds to increase or decrease the amount of kinetic rotational energy stored in the flywheels. In addition, the flywheel regulators include a power control circuit that determines when to store or to retrieve power from the flywheels. A flywheel motor/generator associated with each flywheel stores power in the rotating disk by a process that increases the rotational energy of the rotating disk and draws power from the rotating disk by a process that causes a reduction in the rotational energy of the rotating disk.

The flywheel regulator is connected to the power bus and to the flywheel motor/generator. As noted above, the flywheel regulator includes a power control circuit that allows power to flow to the flywheel motor/generator from the power bus, generally during energy storage periods and that allows power to flow to the power bus from the flywheel motor/generator, generally during energy drawing periods. The flywheel regulator further includes a feedback control loop connected to the power control circuitry and to the power bus. The feedback control loop determines the energy storage periods and the energy drawing periods by comparing a predetermined voltage reference with the power bus voltage. The energy storage periods generally correspond to periods of solar array light exposure, while the energy drawing periods generally correspond to periods of solar array eclipse conditions.

The flywheel regulator may also include a programmable voltage reference which substantially tracks the voltage produced by the solar array. Both the flywheel regulator and the loads may then operate on the appropriate solar array voltage from the beginning of life to the end of life of the solar array without wasting substantial amounts of power through a shunt regulator or series regulator.

DETAILED DESCRIPTION OF THE INVENTION

Figure 1:
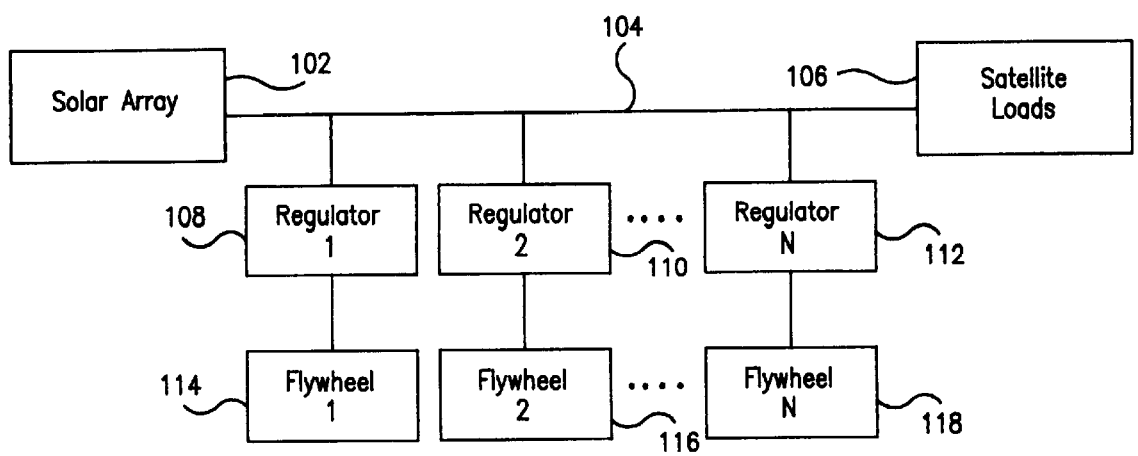
FIG. 1 illustrates a block diagram of a satellite power and pointing control architecture using flywheels.

Turning now to FIG. 1, a block diagram of an example architecture for a satellite power and pointing control system using flywheels is shown. The system includes a solar array 102 connected to a power bus 104. In addition, the satellite loads 106 and the first flywheel regulator 108 and the second flywheel regulator 110 through the Nth flywheel regulator 112 are connected to and draw power front the power bus 104. The first regulator 108 is connected to the first flywheel 114, the second regulator 110 is connected to the second flywheel 116, and the Nth regulator 112 is connected to the Nth flywheel 118.

Each flywheel 114–118 may be constructed, for example, from high strength, low density, composite material disks that may be rotated at various speeds to increase or decrease the amount of rotational kinetic energy stored in the flywheel. Furthermore, the individual flywheels 114–118 are typically configured to operate in pairs.

Rotating flywheels provide torques which depend in part on the speed and direction of rotation of the flywheel. The first flywheel in a given pair rotates in the opposite direction as the second flywheel. As a result, when the flywheels in a pair are perfectly aligned and spin at the same speed, the net torque is zero, and no resultant force is produced. When reaction wheels spin at different speeds, however, a net torque is produced which may be used to steer and point the satellite.

For example, the first flywheel 114 and the second flywheel 116 may comprise a pair aligned along an X-axis. In addition, pairs of flywheels may be aligned along a Y-axis and a Z-axis, and an additional backup pair of flywheels may also be provided. The backup pair of flywheels is positioned so that it may replace any one of the other pairs of flywheels that fails. Thus, a steering and pointing configuration of flywheels may be configured in the same manner as known steering and pointing configurations of reaction wheels. Known control laws are employed to adjust the flywheel speeds under the direction of, for example, a microprocessor. Although both flywheels and reaction wheels may be used to steer and point a satellite, the flywheels 114–118 provide a significant advantage over reactions wheels. Namely, the flywheels 114–118 may also store significant amounts of energy and thereby replace batteries.

Generally, energy may be stored in the flywheels 114–118 by increasing their rotational speed and therefore their kinetic energy. Similarly, energy may be drawn from the flywheels 114–118 by decreasing their rotational speed and therefore their kinetic energy. Furthermore, the regulators 108–112 and the satellite loads 106 may be adjusted to operate under a wide range of voltage and current levels. In other words, the regulators 108–112 and the satellite loads 106 may have a programmable set point. As will be explained in more detail below, the programmable set points allow the operation of the regulators 108–112 and the satellite loads 106 to track the solar array 102 output voltage over the life of the mission. The need for power wasting shunt and series regulators is thereby eliminated or greatly reduced.

Figure 2:
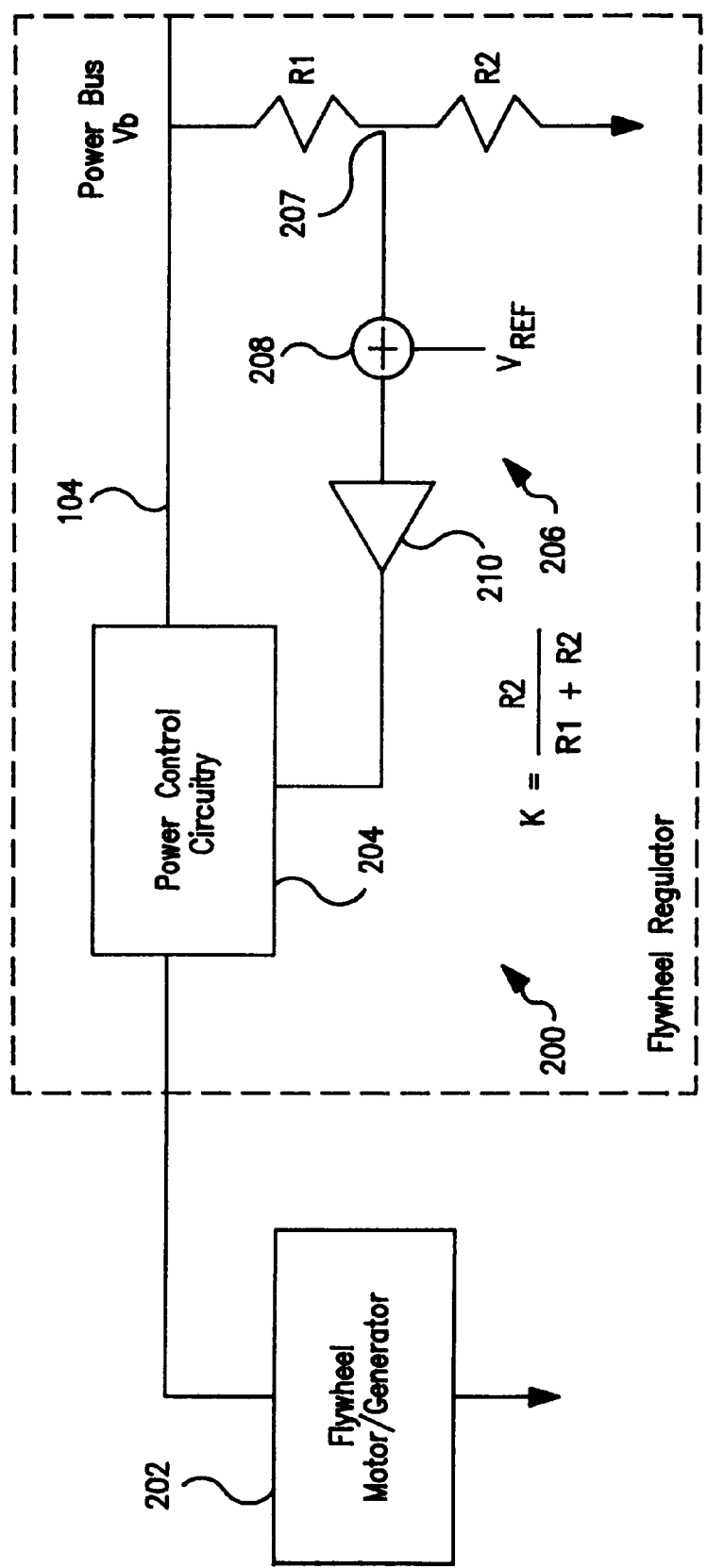
FIG. 2 illustrates a circuit diagram of a flywheel regulator and flywheel motor/generator.

Turning now to FIG. 2, a circuit diagram of a flywheel regulator 200 is shown connected to a flywheel motor/ generator 202. For the purposes of discussion, it will be assumed that the flywheel motor/generator 202 is connected to the first flywheel 114. Although the discussion below will be with reference to a single flywheel regulator, motor/ generator, and flywheel, it is noted that the discussion applies equally to each of the regulators 108–112, motor/ generators and flywheels 114–118 present in the satellite.

The flywheel regulator 200 includes a power control circuit 204 connected to the power bus 104 and a feedback control loop generally designated as 206. The feedback control loop 206 includes a voltage divider network formed from resistor R1 and R2. The output of the voltage divider network 207 (equal to K times the power bus voltage Vb, where $K=R2/(R1+R2)$) is connected to a comparator 208 which is also connected to a reference voltage Vref. In turn, the output of the comparator 208 is connected through an amplifier 210 to the power control circuit 204.

The power control circuit 204 responds to the output of the amplifier 210 to provide the time and duration of flywheel 114–118 energy storage periods and the time and duration of flywheel 114–118 energy drawing periods. During energy storage periods, the power control circuit 204 allows power produced by the solar array 102 and carried by the power bus 104 to flow through the power control circuit 204 to the flywheel motor/generator 202. The flywheel motor/generator 202 uses the power to increase the associated flywheel 114 speed and, thereby, increase the energy stored in the flywheel 114.

During energy drawing periods, on the other hand, the power control circuit 204 allows power produced by the flywheel 114 to flow through the power control circuit 204 to the power bus 104. The flywheel motor/generator 202 provides this power to run the satellite loads 106. Providing power from the flywheel 114 causes a corresponding decrease in the flywheel 114 speed and, thereby, decreases the energy stored in the flywheel 114.

In order to determine whether power should flow to the flywheel 114 or from the flywheel 114, the power control circuitry 204 examines the output of the feedback control loop 206. As noted above, resistors R1 and R2 form a resistor divider network that produces a voltage divider output 207 that is a ratio of the power bus 104 voltage. As the satellite enters a region of space in which it is eclipsed from the light, the power bus voltage provided by the solar array 102 begins to sag. As a result, the voltage divider output 207 also begins to sag.

When the voltage divider output 207 falls below Vref, the amplifier 210 produces an output indicating to the power control circuit 204 that power is needed on the power bus 104. If the voltage on the power bus 104 continues to sag, this may indicate that the satellite is entering a region of eclipse. As a result, the power control circuit 204 may configure itself to allow power to flow from the flywheel 114 to the power bus 104.

In addition, the comparator 208 and the amplifier 210 typically continue to serve as a feedback control loop which detects and regulates the power bus 104 voltage. The comparator 208 provides the difference between Vref and the voltage divider output 207. The difference is amplified by amplifier 210. Thus, the power control circuitry 204 may respond to a sag in the power bus 104 voltage (corresponding to increases in the amplifier output), for example, by allowing additional current to flow to the power bus 104 and instructing the flywheel motor/generator to increase the flywheel 114 power output.

When the satellite enters a light region, the solar array 102 reestablishes its power output on the power bus 104. As a result, the voltage divider output 207 begins to climb. When the voltage divider output 207 exceeds Vref, the amplifier 210 output diminishes and change polarity, indicative of the satellite entering a light region. In response, the power control circuitry 204 may detect that it is no longer required to draw power from the flywheel 114. Thus, the power control circuitry 204 is able to detect that the satellite has entered a light region and that it should reconfigure itself to allow power to flow from the power bus 104 to the flywheel 114.

Figure 3:
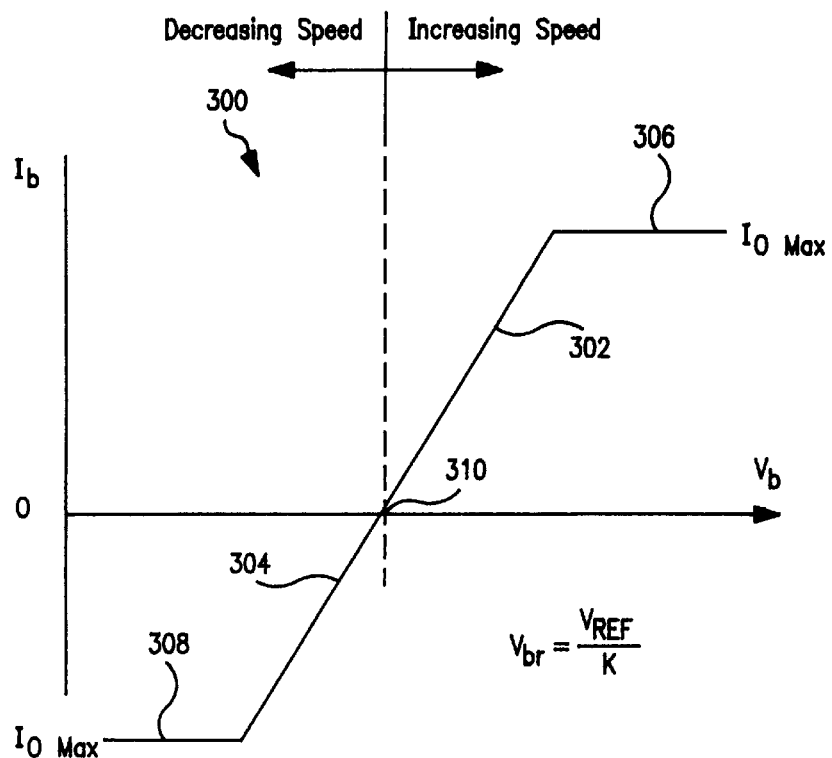
FIG. 3 shows a typical flywheel motor/generator current-voltage profile.

Turning now to FIG. 3, a graph of a typical flywheel regulator voltage-current profile 300 is shown. The graph has a linear positive segment 302, a negative linear segment 304 and current limit segments 306 and 308. A set point 310 Vbr (approximately equal to Vref/K) is set on the power bus 104 voltage (Vb) axis. Vbr represents the power bus 104 voltage at which just enough energy is available for the spacecraft loads 106. In other words, when the power bus 104 voltage is at Vbr, no power need be drawn from the flywheel 114 and no power is delivered to the flywheel 114.

As the power bus 104 voltage sags below Vbr, however, the flywheel regulator 200 operates on the negative linear segment 304. As a result, the power control circuitry 204 configures itself to allow power to flow from the flywheel 114 to the power bus 104. The negative linear segment 304 indicates that the flywheel motor/generator 202 is generating current which is flowing from the flywheel 114 to the power bus 104 to provide power for the loads 106 (correspondingly, the flywheel 114 speed is decreasing). Operation on the negative linear segment 304 is typical of operation during an eclipse period.

On the other hand, when the power bus 104 voltage increases above Vbr, the flywheel regulator 200 operates on the positive linear segment 302. The power control circuitry 204 configures itself to allow power to flow to the flywheel 114 from the power bus 104. The positive linear segment 302 indicates that the flywheel motor/generator 202 is using current which is flowing from the power bus 104 to increase the rotational speed of the flywheel 114 (correspondingly, the energy stored in the flywheel 114 speed increases). Operation on the positive linear segment 304 is typical of operation in a light region and that the solar array 102 is providing power on the power bus 104.

Because Vbr=Vref/K, the set point 310 may be adjusted up and down the Vb axis in FIG. 3 by adjusting Vref or K during the mission life of the satellite. Local feedback circuits in the flywheel regulator 200 allow the flywheel regulator 200 to operate over a wide range of set points and maintain the positive linear segment 302 and the negative linear segment 304 shown in FIG. 3. Furthermore, the local feedback circuits may be adjusted to set the slope of the positive linear segment 302 and the negative linear segment 304 over a wide range. Adjusting Vbr during the mission life allows the flywheel regulator 200 to adapt to the changing power output characteristics of the solar array 102 over time without the need to waste significant amounts of solar array 102 power, as will be explained below.

Furthermore, because individual flywheel regulators 108–112 are used for each flywheel 114–118, the set points for each regulator may be adjusted independently. Thus, when the control laws need to cause a steering or pointing change in the satellite, the control laws may individually vary the speeds of each flywheel 114–118 to achieve he desired result. Individually varying the speeds of each flywheel 114–118 may be accomplished by manipulating the set points for each flywheel regulator 108–112.

For example, in order to reduce the speed of the first flywheel 114 with respect to the other flywheels 116–118, the flywheel regulator 108 may have its corresponding Vbr increased. The associated set point graph (FIG. 3) is thereby shifted to the right and energy is drawn out of the flywheel 114 at a faster rate compared to the other flywheels 116–118, resulting in a relative speed decrease in the first flywheel 114. The changes in Vbr may also track the power output of the solar array 102 over the mission life.

Figure 4:
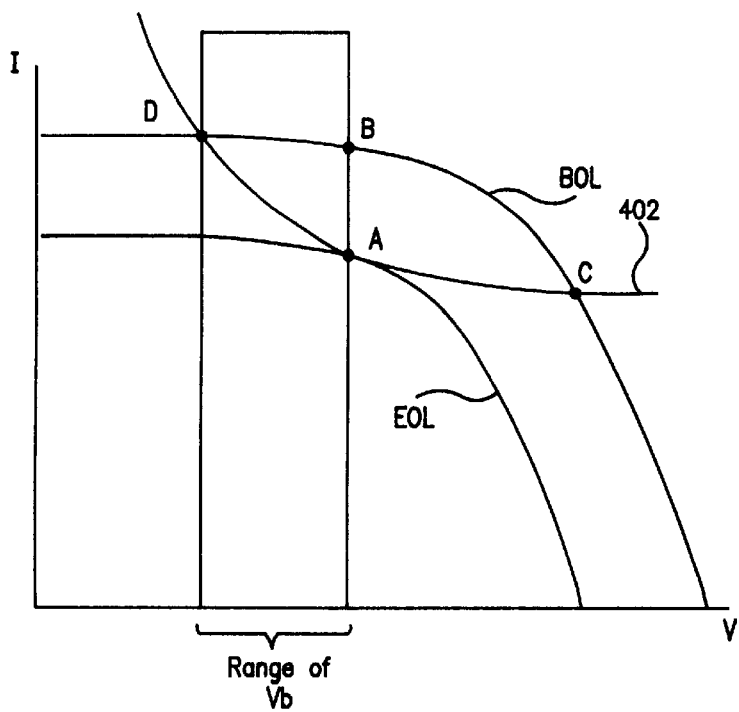
FIG. 4 shows a typical variation in solar array voltage and current characteristics from the beginning of life to the end of life of the solar array.

Turning now to FIG. 4, a graph of the power output of a typical solar array is shown at beginning of life (BOL) and end of life (EOL). A satellite load 106 demand curve 402 of approximately constant power is shown drawn through points D, A, and C. For illustrative purposes, it will be assumed that the power output graph shown in FIG. 4 is indicative of the power output of the solar array 102. The power output generally decreases from BOL to EOL due to the solar array 102 exposure to the radiation environment of outer space.

During the design phase in prior satellite designs, the solar array 102 is sized so that he EOL power will be capable of meeting the load demand and charging the batteries. The EOL power is designated point A in FIG. 4. Point A also represents the voltage at which maximum power can be extracted from the solar array 102 at EOL. As noted above, batteries are restricted to operate at a fixed predetermined voltage which is normally selected to correspond with point A on the solar array 102.

Consequently, the fixed battery voltage forces the power system to operate at point B at BOL (i.e., at the same voltage at both BOL and EOL). As a result, the excessive solar array 102 power at point B must be dissipated and is typically wasted, for example, by a shunt regulator, because battery voltage cannot be adjusted during flight. Many thousands of watts of power may be wasted in order to meet the voltage requirements of fixed voltage batteries.

On the other hand, the flywheel system described above can be programmed to operate over a predetermined range of voltages from BOL to EOL by adjusting Vbr. Adjustments to Vbr adjust the set point 310 and therefore the operating point of the flywheel regulator 200. As an example, the flywheel regulator 200 set point 310 may be set to point D at BOL, the point at which just sufficient power is provided to meet the demands of the satellite loads 106 and charge the flywheels. As the solar array 102 power decreases during mission life, the flywheel regulator 200 set point 310 can be increased to provide the desired power for the satellite loads 106 and the flywheels 114–118. In other words, the operating voltage of the flywheel regulator 200 may be adjusted to track the power curve 402 through point A, at which maximum power is delivered at $EDI_,$.

As noted above, each of the flywheel regulators 108–112 may operate in an identical manner. Each of the flywheels 114–118 may then operate as an energy storage device with a programmable voltage. Allowing the programmable voltage to track the solar array 102 power output characteristics and substantially eliminate the need for batteries and shunt or series regulators and their associated size, weight, and cost. Furthermore, a flywheel system as described above may provide as much as a three to one weight advantage over common nickel-hydrogen batteries.

At this point, a numerical example may be helpful in understanding operation of the flywheel regulators. Assuming that point B in FIG. 4 corresponds to 100V, that Vref=65V, and that K=0.75 for all regulators, then Vbr=86V (approximately) for all regulators. In a light region, the solar array 102 produces 100V on the power bus 104. According to the voltage-current profile 300, the power bus 104 current (Ib) is positive. In other words, the flywheel regulators 108–110–112 are operating on the positive linear segment 302 and energy is being stored in the flywheels 114–116–118 as increasing rotational speed. If the control law coordinating satellite pointing and steering requires that the flywheel 114 rotate slower than the other flywheels 116–118, then the Vbr for flywheel 114 may be increased.

For example, increasing Vref to 70V would adjust Vbr to 93V. As a result, the current-voltage profile 300 is shifted right, and the portion of Ib flowing into regulator 108 is reduced. The reduction in Ib reduces the amount of energy being stored in the flywheel 114. Therefore, the flywheel 114 speed is increasing, but at a slower rate than the other flywheels 116–118.

One the other hand, if the control law coordinating satellite pointing and steering requires that the flywheel 114 rotate faster than the other flywheels 116–118, then the Vbr for flywheel 114 may be decreased. A decrease in Vbr would shift the current-voltage profile 300 to the left and increase the portion of Ib flowing through regulator 108, thereby increasing the amount of energy stored in flywheel 114 over the other flywheels 116–118.

Alternatively, the control law may cause any individual flywheel to rotate at different speeds in other manners. For example, feedback from the control law may be used to adjust the slope of the positive linear segment 302 and the negative linear segment 304. As a result, although the set point is not changed, lesser or greater current is allowed to flow to the flywheel motor/generators in comparison with the other flywheels, thereby creating a difference in flywheel speed.

While particular elements, embodiments and applications of the present invention have been shown and described, it is understood that the invention is not limited thereto since modifications may be made by those skilled in the art, particularly in light of the foregoing instruction. It is therefore contemplated by the appended claims to cover such modifications as incorporate those features which come within the spirit and scope of the invention.

What is claimed is:

1. A satellite power regulation system comprising:
    a power bus;
    a flywheel capable of storing rotational energy coupled to a flywheel controller for increasing said rotational energy when storing power in said flywheel and for reducing said rotational energy when drawing power from said flywheel;
    a flywheel regulator connected to said power bus and to said flywheel controller, said flywheel regulator comprising:
        a power control circuit that allows power to flow said flywheel controller from said power bus during an energy storage period an that allows power to flow to said power bus from said flywheel controller during an energy drawing period; and
        a feedback control loop connected to said power control circuit and to said power bus, said feedback control loop providing an output indicative of said energy storage period and said energy drawing period based upon a set point and a power bus voltage reference;
    wherein said set point is a variable set point to be adjusted during mission life from a beginning-of-life power point to an end-of-life power point based on variable solar array power output during mission life.

2. The system of claim 1, further comprising a solar array connected to said power bus, said solar array producing said variable solar array power output during mission life.

3. The system of claim 2, wherein said variable set point tracks a constant power demand curve through the beginning-of-life power point to the end-of-life power point.

4. The system of claim 3, wherein said flywheel controller comprises an electric generator and an electric motor.

5. The system of claim 4, wherein said power bus voltage reference comprises a resistor voltage divider.

6. The system of claim 5, wherein said feedback control loop comprises said resistor voltage divider, a comparator connected to said resistor voltage divider and a voltage reference based on said variable set point, and a amplifier connected to said first comparator.

7. The system of claim 1, wherein said set point is further adjustable to effect steering changes by adjusting said set point to change said rotational energy with respect to an additional flywheel paired with said flywheel thereby creating a net torque.

8. A method for satellite power regulation, the method comprising:
    determining energy storage periods and energy drawing periods based upon a set point and a power bus voltage reference;
    increasing rotational energy in a flywheel to store power in said flywheel during said energy storage periods;
    decreasing rotational energy in said flywheel to draw power from said flywheel during said energy drawing periods; and
    varying said set point during mission life from a beginning-of-life power point to an end-of-life power point based on variable solar array power output during mission life.

9. The method of claim 8, wherein varying said set point comprises varying said set point to track a constant power demand curve through the beginning-of-life power point to the end-of-life power point.

10. The method of claim 8 further comprising effecting steering changes by adjusting the set point to change said rotational energy with respect to an additional flywheel paired with said flywheel.

11. The method of claim 10, wherein effecting steering changes comprises adjusting the set point lower to increase said rotational energy.

12. The method of claim 10, wherein effecting steering changes comprises adjusting the set point higher to decrease said rotational energy.

13. The method of claim 8, wherein determining energy storage periods comprises determining energy storage periods and energy drawing periods based upon a voltage reference derived from said set point and said power bus voltage reference.

14. The method of claim 13, wherein determining energy storage periods further comprises determining energy storage periods when said voltage reference is below said power bus voltage reference.

15. The method of claim 13, wherein determining energy storage periods further comprises determining energy drawing periods when said voltage reference is above said power bus voltage reference.

* * * * *